United States Patent [19]

Yamada

[11] Patent Number: 4,777,842

[45] Date of Patent: Oct. 18, 1988

[54] STRUCTURE OF CAMSHAFT BEARING

[75] Inventor: Minoru Yamada, Okazaki, Japan

[73] Assignee: Toyota Jidosha Kabushiki Kaisha, Toyota, Japan

[21] Appl. No.: 42,529

[22] Filed: Apr. 24, 1987

Related U.S. Application Data

[63] Continuation of Ser. No. 823,109, Jan. 27, 1986, abandoned.

[30] Foreign Application Priority Data

Jan. 29, 1985 [JP] Japan .................. 60-9980[U]

[51] Int. Cl.⁴ .......................................... F16H 53/02
[52] U.S. Cl. ........................... 74/567; 123/90.27; 123/90.34
[58] Field of Search ............ 74/579 R, 579 E, 567, 74/44, 605; 384/398, 432, 430, 434; 29/156.5 A; 123/197 AB, 197 AC, 196 R, 90.33, 90.27, 90.34, 90.36

[56] References Cited

U.S. PATENT DOCUMENTS

| | | | |
|---|---|---|---|
| 588,699 | 8/1897 | Emery | 74/605 |
| 634,204 | 10/1899 | Diehl | 74/605 |
| 1,183,145 | 5/1916 | Watts et al. | 123/90.33 X |
| 2,562,404 | 7/1951 | Aland | 123/90.34 X |
| 3,477,417 | 11/1969 | Moutin | 123/90.34 X |
| 3,704,696 | 12/1972 | Abell, Jr. | 123/90.33 |
| 4,105,267 | 8/1978 | Mori | 384/398 X |
| 4,199,202 | 4/1980 | Maeda | 74/605 X |
| 4,258,673 | 3/1981 | Stoody, Jr. et al. | 123/90.34 |
| 4,370,901 | 2/1983 | Bolen | 74/44 X |
| 4,430,968 | 2/1984 | Futakuchi et al. | 123/90.27 |
| 4,441,465 | 4/1984 | Nakamura | 123/90.33 X |
| 4,534,325 | 8/1985 | Tanaka | 384/432 X |
| 4,537,166 | 8/1985 | Kimura et al. | 123/90.34 X |
| 4,565,168 | 1/1986 | Rivere | 123/90.27 X |
| 4,660,515 | 4/1987 | Arakawa et al. | 123/90.36 X |
| 4,672,926 | 6/1987 | Gadefelt et al. | 123/90.34 |
| 4,684,267 | 8/1987 | Fetouh | 74/579 E X |

FOREIGN PATENT DOCUMENTS

| | | | |
|---|---|---|---|
| 115996 | 8/1984 | European Pat. Off. | 123/90.33 |
| 54-123612 | 9/1979 | Japan | 123/90.33 |
| 141228 | 9/1982 | Japan . | |
| 421288 | 12/1934 | United Kingdom | 74/605 |

Primary Examiner—Gary L. Smith
Assistant Examiner—Rodney M. Lindsey
Attorney, Agent, or Firm—Cushman, Darby & Cushman

[57] ABSTRACT

An oil groove capable of holding oil is formed on the inside surface of a camshaft bearing consisting of a cylinder head and a cam cap, at a position where the valve spring force acts. Oil is supplied to the oil groove from a cavity in a camshaft via an orifice provided in the camshaft. Since the part of the camshaft bearing which is exposed to the severest frictional contact is preferentially lubricated and at the same time the camshaft bearing as a whole can be well lubricated, even when the oil supply pressure from oil pump is insufficient on account of low engine speed or even when the viscosity of oil is low due to high temperature and thereby the oil film at the camshaft bearing is very thin, the camshaft bearing can be maintained in a well-lubricated state by the oil held in the oil groove, and thereby the binding can be prevented.

6 Claims, 3 Drawing Sheets

STRUCTURE OF CAMSHAFT BEARING

This is a continuation of application Ser. No. 823,109, filed Jan. 27, 1986, which was abandoned upon the filing hereof.

BACKGROUND OF THE INVENTION

1. Field of the Invention

The present invention relates to a structure of a camshaft bearing which supports a camshaft of an internal combustion engine.

2. Description of the Prior Art

In an internal combustion engine, an intake valve or an exhaust valve is opened or shut by a cam which rotates together with a camshaft. The camshaft is usually rotatably supported by a bearing including a portion of the cylinder head and a portion of the cam cap and its rotation is linked to the rotation of a crankshaft of the engine. The camshaft bearing is lubricated with oil which is supplied through the typically hollow camshaft. An orifice extends from the camshaft cavity to the surface of the camshaft under the bearing. Oil, pumped up from an oil pan, is fed to the bearing via the hollow camshaft and the orifice.

However, when the oil become hot and therefore has low viscosity, the oil is particularly thin and flows easily at the camshaft bearing, and thereby the thickness of the oil film becomes nearly zero at the contact portion of the surface of the camshaft with the inner surface of the camshaft bearing. Moreover, when the engine is running at very low speeds (e.g., less than 100 rpm), the oil pump which is driven by the crankshaft also rotates slowly, and thereby the oil pressure from the oil pump is very low. Therefore, when the engine is running at very low speeds with the oil hot and therefore having low viscosity, the supply of oil to the camshaft bearing is often insufficient. When the lubrication of the camshaft bearing is not satisfactory, the camshaft is liable to momentarily bind at the camshaft bearing and generate a noise. This momentary binding is liable to happen at a position where a valve spring applies a force on the camshaft bearing when the cam is pushed by a valve spring in the working direction of the valve spring force.

As an example of an improved bearing structure in which a shaft is urged in a direction normal to the axis of the shaft for the purpose of holding an appropriate volume of oil and obtaining sufficient lubrication of a bearing, Japanese Utility Model Publication SHO No. 57-141228 discloses an improved structure for the small end of a connecting rod, but there is no example of a camshaft bearing having been structurally improved for the purpose of obtaining sufficient lubrication even under severe engine condition.

SUMMARY OF THE INVENTION

An object of the present invention is to provide a camshaft bearing structure which can provide sufficient lubrication even in the case of low oil pressure at the bearing position, thereby preventing the generation of a momentary bind at the camshaft bearing and associated.

A structure of a camshaft bearing according to the present invention satisfies the above object and rotatably supports a camshaft which is equipped with a cam capable of pushing down a valve against a valve spring force. The camshaft bearing according to the present invention comprises a portion of the cylinder head and a portion of the cam cap. An orifice is formed in the hollow camshaft connecting the interior cavity with an oil groove formed on the inner surface of the camshaft bearing. The oil groove is formed at a position of the inner surface of the camshaft bearing where the valve spring force acts, and the oil groove is formed to hold oil delivered through the orifice.

The oil supplied to the camshaft bearing via the camshaft cavity and the orifice lubricates the portion of the camshaft supported by the bearing and inner surface of the camshaft bearing itself. Also, the appropriate volume of oil is held in the oil groove. Even when the oil is heated to a high temperature, the viscosity of the oil is reduced and the engine speed is very low, causing low oil pressure, the oil held in the oil groove can lubricate the inner surface of the camshaft bearing and the outer surface of the camshaft. Therefore the camshaft bearing can be maintained in a well-lubricated state, without binding or noise. Moreover, since the oil groove is located at a position where the valve spring force acts, that is, at a position exposed to the severest condition in terms of frictional rotation, momentary binding can be efficiently prevented.

BRIEF DESCRIPTION OF THE DRAWINGS

The above and other objects, features and advantages of the present invention will be become apparent and more readily appreciated from the following detailed description of the preferred exemplary embodiments of the invention, taken in conjunction with the accompanying drawings, in which.

DETAILED DESCRIPTION OF THE PREFERRED EMBODIMENTS

FIGS. 1 to 5 show a first embodiment of the present invention.

Figure 1:
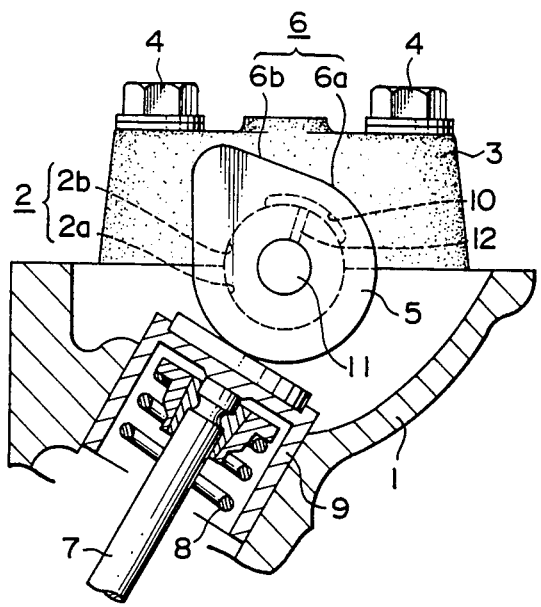
FIG. 1 is a sectional view of an upper portion of an internal combustion engine showing a camshaft bearing according to a first embodiment of the present invention.

FIG. 1 shows the upper portion of an over head camshaft type internal combustion engine. Reference numeral 1 is a cylinder head, at the top end of which is formed a cylinder head bearing 2a consisting of a semi-circular depression opened upward. Several bearings 2a are located at positions in the longitudinal direction of the internal combustion engine. A cam cap 3 covers cylinder head bearing 2a and it is fastened to cylinder head 1 by a cap bolts 4. In cam cap 3, a cam cap bearing 2b, consisting of a semi-circular depression opened downward is formed. Cylinder head bearing 2a and cam cap bearing 2b constitute a camshaft slide bearing 2 with a circular inner surface.

Figure 2:
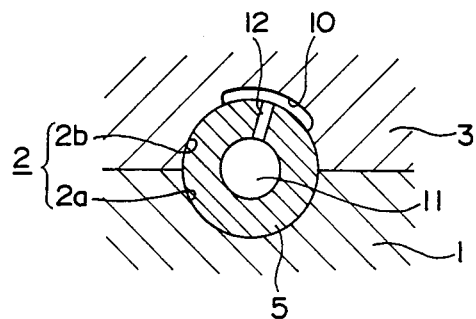
FIG. 2 is a partial sectional view showing an oil groove and an orifice according to the first embodiment of the present invention.
Figure 3:
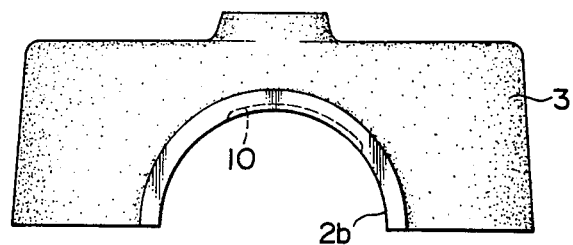
FIG. 3 is an elevational view of a cam cap according to the first embodiment of the present invention.

Camshaft bearing 2 rotatably supports a camshaft 5. Camshaft 5 is rotatably linked to the crankshaft. A cam 6 is formed integrally on camshaft 5. As shown in FIG. 2, camshaft 5 is supported by camshaft bearing 2 at an appropriate position other than at cam 6.

Cam 6 consists of a circular base portion 6a and a cam nose 6b protruding from base portion 6a in the radial direction of camshaft 5. When cam 6 rotates together with camshaft 5, cam nose 6b pushes down a valve 7 (intake valve or exhaust valve) of the engine, thereby enabling intake or exhaust. Valve 7 is urged upward by the force of a valve spring 8 and cam 6 is brought into sliding contact with a valve lifter 9 which is located between the head of valve 7 and cam 6. When valve 7 is not being pushed down by cam nose 6, the intake port or the exhaust port is closed by valve 7. When cam nose 6b pushes down valve 7 against the force of valve spring 8, cam 6 and camshaft 5 are urged to the direction where a reaction force of the valve spring force acts and the urging force is received by camshaft bearing 2. This urging force acts at cam cap bearing 2b of camshaft bearing 2.

Figure 4:
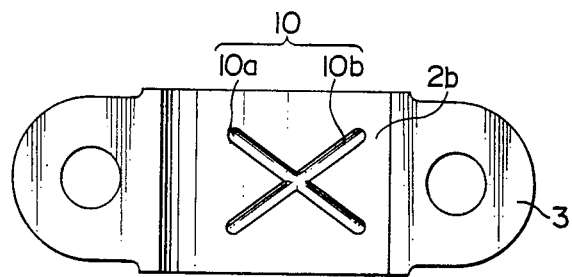
FIG. 4 is a bottom view of the cam cap showing the shape of the oil groove according to the first embodiment of the present invention.
Figure 5:
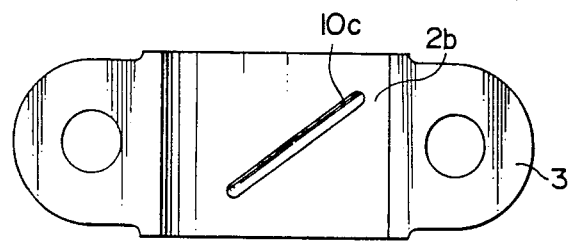
FIG. 5 is a bottom view of the cam cap showing another shape of the oil groove according to the first embodiment of the present invention.

In camshaft bearing 2, more specifically on the inner surface of cam cap bearing 2b of cam cap 3, as illustrated in FIGS. 2 to 5, an oil groove 10 is formed at a position where the valve spring force acts. Both ends of oil groove 10 terminate short of the edges of camshaft bearing 2 in the axial direction, so that oil being held in oil groove 10 cannot escape, in the axial directions, out of either side of camshaft bearing 2. Oil groove 10 is formed, as illustrated in FIG. 4, as an X-shaped intersection of two grooves 10a and 10b extending obliquely with respect to the axial direction of camshaft 5. Oil groove 10 also can be formed, as illustrated in FIG. 5, as a groove 10c extending obliquely with respect to the axial direction of camshaft 5.

Camshaft 5 is hollow with both ends plugged defining oil cavity 11. Cavity 11 is supplied with oil which is pumped up and forcibly fed from an oil pan by an oil pump driven by the crankshaft. For each bearing 2, an orifice 12 extends in the radial direction of camshaft 5 between cavity 11 and the inner surface of camshaft bearing 5. A portion of oil supplied to cavity 11 is fed to camshaft bearing 2 via orifice 12.

In this first embodiment of the present invention, camshaft bearing 2 is lubricated in the following manner. The oil pumped up and pressurized by the oil pump reaches the cylinder head from the main oil hole of the cylinder block and goes into cavity 11 of camshaft 5 via the camshaft support at opposite ends of the engine. A portion of the oil delivered to cavity 11 is sent to camshaft bearing 2 through orifice 12. This oil lubricates the sliding area between camshaft 5 and camshaft bearing 2, and at the same time fills up oil groove 10. An adequate volume of oil can be held in oil groove 10 which is so profiled as to be able to hold the oil therein. At low engine speeds, the oil pump also works at low speed. Therefore the pressure at which the oil pump feeds the oil is also low. Thus the volume of oil supplied to camshaft bearing 2 drops. When the temperature of oil become high, the viscosity of oil drops, and thereby the thickness of oil film becomes to nearly zero at the contacting portion of the surface of camshaft 5 with the inner surface of camshaft bearing 2. When the engine speed is low and the temperature is high, the lubricating performance of the oil supplied from the oil pump to camshaft bearing 2 drops to a great extent.

Even then, however, a sufficient volume of oil for lubrication of camshaft bearing 2 will be held in oil groove 10 and camshaft bearing 2 will be maintained in a well-lubricated state. Since oil groove 10 is located at the position where the spring force of valve spring 8 acts, this position will be preferentially lubricated. This is the part of camshaft bearing 2 most likely not to be lubricated and to develop a momentary bind when the oil supply is insufficient. However, the presence of oil groove 10 which guarantees a supply of oil for lubrication ca reliably prevent binding.

Thus, since a necessary supply of oil is supplied to lubricate camshaft bearing 2 and an ample supply of oil is supplied to the area exposed to the severest frictional contact, camshaft bearing 2 can be maintained in a well-lubricated state even when the oil supply from cavity 11 would be otherwise insufficient.

Figure 6:
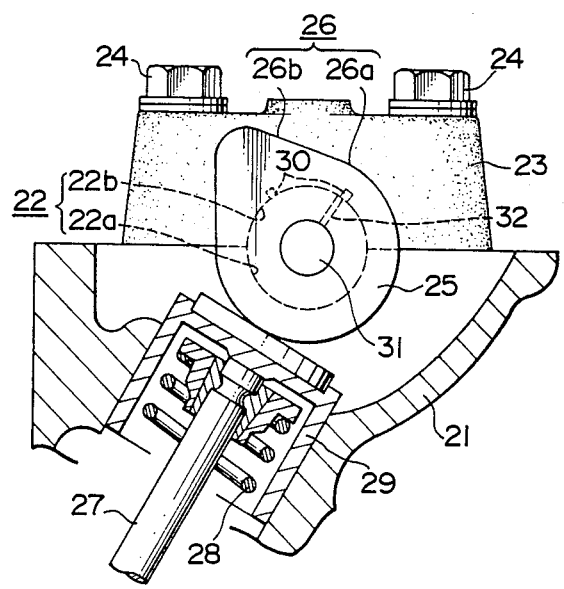
FIG. 6 is a sectional view of an upper portion of an internal combustion engine showing a camshaft bearing according to a second embodiment of the present invention.
Figure 7:
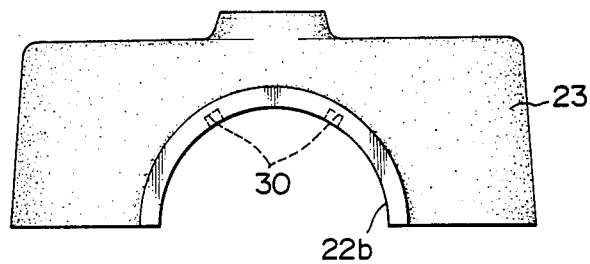
FIG. 7 is an elevational view of a cam cap according to the second embodiment of the present invention.
Figure 8:
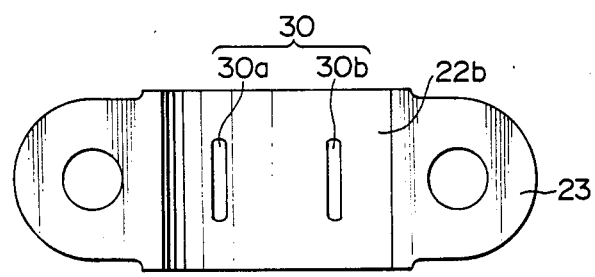
FIG. 8 is a bottom view of the cam cap according to the second embodiment of the present invention.

Next, a second embodiment of the present invention is shown in FIGS. 6 to 8.

In this embodiment, oil grooves 30 has a different profile from the one in the first embodiment. Tne other parts, i.e., cylinder head 21, camshaft bearings 22, 22a, 22b, cam cap 23, cap bolt 24, camshaft 25, cam 26, 26a, 26b, valve 27, valve spring 28, valve lifter 29, oil cavity 31 and orifice 32 are substantially the same as the parts in the first embodiment.

Oil grooves 30 formed on camshaft bearing 22b of cam cap 23 consists of a pair of grooves 30a and 30b extending parallel to the axis of camshaft bearing 22 at positions where the force of valve spring 28 acts on camshaft bearing 22b. Oil grooves 30 opens toward the inside of camshaft bearing 22.

In this embodiment, the oil delivered to camshaft bearing 22 through oil cavity 31 and orifice 32 of cam shaft 25 lubricates camshaft bearing 22 and a portion of it is retained in oil grooves 30.

Thus even when the engine is running at a very low speed, the viscosity of oil has been reduced due to high temperature, and the volume of the oil supplied has decreased, camshaft bearing 22 can be well lubricated.

Meanwhile since oil grooves 30a and 30b extend parallel to the axis of camshaft bearing 22, that is, extend in a direction normal to the direction of the rotation of camshaft 25, the oil at camshaft bearing 22 moves in the direction of being collected in oil grooves 30 in accordance with the rotation of camshaft 25, while the oil which fills oil grooves 30 flows little by little toward the areas other than oil grooves 30. The result is that the area where the force of valve spring 28 acts is particularly well lubricated and camshaft bearing 22 as a whole is well lubricated.

Figure 9:
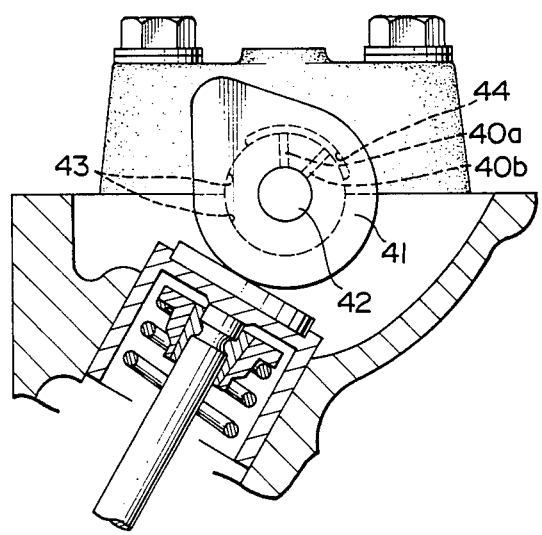
FIG. 9 is a sectional view of an upper portion of an internal combustion engine showing a camshaft bearing according to a third embodiment of the present invention.

The number of oil grooves 30a, 30b in this case is two, but an arbitrary number of them can be provided. In the embodiment of FIG. 9, a plurality of orifices 40a, 40b are provided. It is desirable that at least one orifice is provided for each camshaft bearing, and as illustrated in this embodiment, a plurality of orifices 40a, 40b may be provided so that an ample supply of oil is supplied from oil cavity 42 of camshaft 41 to camshaft bearing 43. Under this arrangement the volume of oil supplied to oil groove 44 will be improved and accordingly even when the viscosity of oil has been reduced due to high temperature and its supply pressure drops due to low engine speeds, a sufficient volume of the oil will always be held in oil groove 44, ensuring good lubrication of camshaft bearing 43.

Although only several preferred embodiments of the present invention have been described in detail, it will be appreciated by those skilled in the art that various modifications and alterations can be made to the particular embodiments shown without materially departing from the novel teachings and advantages of this invention. Accordingly, it is to be understood that all such modifications and alterations are included within the scope of the invention as defined by the following claims.

What is claimed is:

1. A camshaft assembly for opening and closing a valve by applying a pushing force to said valve against the force of a valve spring which is disposed with respect to said valve so as to urge said valve closed, comprising:
    a camshaft defining a cavity and at least one orifice extending from said cavity to a surface of said camshaft;
    at least one cam attached to said camshaft and directly touching an upper portion of a stem of said valve for applying said pushing force to said valve stem against said valve spring force with rotation of said camshaft; and
    means for defining a bearing surface against which said camshaft rotates, said defining means comprising an upper portion of a cylinder head and a cam cap fixed on said upper portion of said cylinder head, said upper portion of said cylinder head forming a lower surface of said bearing surface and said cam cap forming an upper surface of said bearing surface, said at least one orifice being positioned at said bearing surface of said defining means in the axial direction of said camshaft, and at least one oil groove being defined in said upper surface of said bearing surface at a position receiving the severest friction during rotation of said camshaft, said position being where said valve spring force acts via said valve stem, said at least one cam and said camshaft when said at least one cam pushes said valve stem against said valve spring force, and said at least one oil groove terminating short of edges of said cam cap and being formed so as to hold oil supplied through said cavity and said at least one orifice, said oil preferentially lubricating said position in said upper surface of said bearing surface where said valve spring force acts in order to prevent binding of said camshaft.

2. The camshaft assembly of claim 1, wherein a plurality of said orifices are provided for said defining means.

3. The camshaft of claim 1, wherein a plurality of said oil grooves are formed in said upper surface of said bearing surface.

4. The camshaft assembly o claim 1, wherein said at least one oil groove is formed as an X-shaped intersection of two grooves.

5. The camshaft assembly of claim 1, wherein said at least one oil groove is formed as a groove extending obliquely with respect to the axial direction of said camshaft.

6. The camshaft assembly of claim 1, wherein said at least one oil groove includes a plurality of grooves extending parallel to the axis of said camshaft.

* * * * *